May 13, 1952 T. C. WHITEHEAD 2,596,632
MIRROR SUPPORTING MEANS
Filed Feb. 5, 1946 2 SHEETS—SHEET 2

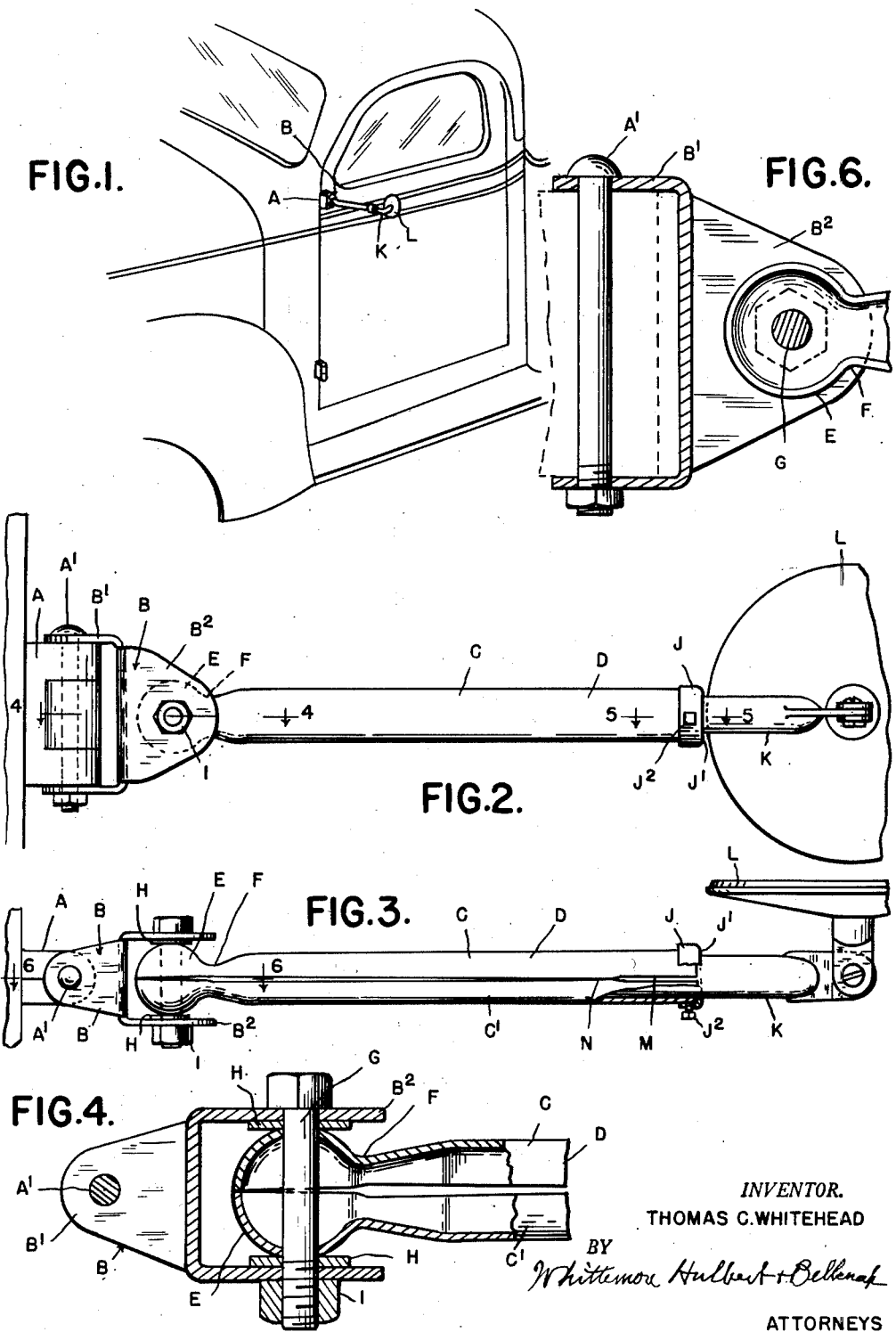

*INVENTOR.*
THOMAS C. WHITEHEAD
BY
ATTORNEYS

Patented May 13, 1952

2,596,632

UNITED STATES PATENT OFFICE 2,596,632

MIRROR SUPPORTING MEANS

Thomas C. Whitehead, Detroit, Mich., assignor to Whitehead Stamping Company, Detroit, Mich., a corporation of Michigan Application February 5, 1946, Serial No. 645,556

1 Claim. (Cl. 248—279)

The invention relates to rear view mirrors for use on motor vehicles and more particularly to that type used on commercial vehicles and including a relatively long mirror supporting arm. With such constructions the arm is pivotally mounted on the vehicle body so that it may be extended laterally outward when in use but adapted to be arranged in substantially vertical upward extending position when not needed or when the vehicle is parked close to other vehicles in a garage or the like. Friction in the pivotal joint is depended upon to hold the arm in this upright position but it frequently happens that this friction will be diminished by use of the device so that the arm will not remain in the position to which it is adjusted.

It is the object of the instant invention to obtain an exceedingly simple and neat construction which will remain operative during the life of the structure to hold the mirror in whatever position it may be adjusted. The invention, therefore, consists in the construction as hereinafter set forth.

In the drawings:

Fig. 1 is a perspective view of a portion of a motor vehicle body showing my improved mirror support attached thereto;

Fig. 2 is a side elevation of the mirror support;

Fig. 3 is a plan view thereof;

Fig. 4 is an enlarged vertical section on line 4—4, Fig. 2;

Fig. 6 is an enlarged section on line 6—6, Fig. 3;

Figure 5:
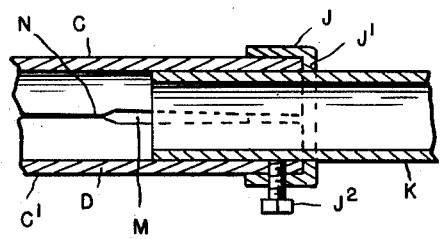
Fig. 5 is an enlarged section on line 5—5, Fig. 2.

My improved mirror support may be conveniently attached to one of the hinges of the vehicle door, such as A. B is a sheet metal stamping having pairs of spaced ears B', B² struck out therefrom to extend in transverse planes. The ears B' embrace the hinge A and may be secured thereto by the hinge pivot bolt A'. The ears B² form the connection with the mirror supporting arm which is of the following construction. C and C' are similar stampings each fashioned to form a semi-cylindrical portion D terminating at its inner end in a semi-spherical portion E with a reduced neck portion F therebetween. The portions E are embraced by the ears B² of the stamping B and are pivotally attached thereto by a bolt G. Washers H sleeved on the bolt G are placed between the semi-spherical portions E and the ears B², and a nut I engages the threaded end of the bolt and holds the parts together. At the opposite end of the cylindrical portions D of the members C and C' there is a collar J. This, as shown in Fig. 5, has an inturned flange J' against which the ends of the portions D abut. A set screw J² at one side of the collar serves to clamp the sections D about an extension tube K on which the mirror L is mounted. Thus, the mirror supporting arm formed by the members C, C' and K may be swung upon the pivot bolt G to extend alternatively in an upright or a horizontal position.

In order that the mirror supporting arm as above described may be frictionally held in different positions of adjustment, the members C and C' have their adjacent edges at the outer end thereof relieved or cut away as indicated at M. The parts are also proportioned so that when the collar J engages the outer ends of said members C and C', it will draw them slightly together. The foregoing requires that the internal radius of the collar J shall be smaller than the external radius of the semi-cylindrical portions D, so that to fit the collar J over the ends of portions D, as shown in Figures 2 and 3, the relieved end portions M are moved toward each other, thus relatively rocking members C and C' about fulcrums N. This separates the adjacent edges of members C and C', and when portions E are moved together between ears B², members C and C' assume the bowed condition clearly illustrated in Figure 3. Portions N adjacent to the cutaway portion M will form a fulcrum on which the sections will tilt so as to spread the spherical inner end portions away from each other. Thus, an outward bias is given to these members but on account of the resiliency of the material, they can be pressed together to pass between the ears or furcations B² of the member B and are held in this position by the bolt G and nut I. Constant friction will be developed between the semi-spherical portions E, washers H and ears B² which is sufficient to hold the mirror supporting arm in any position to which it may be adjusted. Furthermore, this resilient pressure will continue throughout the life of the structure and without regard to any wear in the parts. I, therefore, obtain by this simple construction a mirror supporting arm which will remain operative throughout its life to hold the mirror in adjusted position. It will also be observed that the location of the semi-spherical portions E between the ears of the stamping is such that the semi-spherical portions are substantially concealed by the ears. As a result a very neat self-contained structure is obtained.

Figure 7:
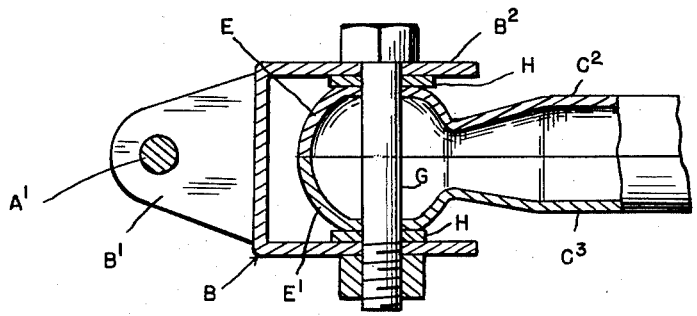
Fig. 7 is a view similar to Fig. 4 showing a modified construction.

With the modification illustrated in Fig. 7, the two sections of the tube C², C³ have their adjacent edges permanently in contact which is also true of the semi-spherical portions E and E'. The latter are, however, sufficiently flexible and resilient to permit of deforming the same by the tightening of the clamping bolt G. Consequently, these members are biased to return to the original form and will, therefore, maintain friction with the bracket even after wear occurs.

Figure 8:
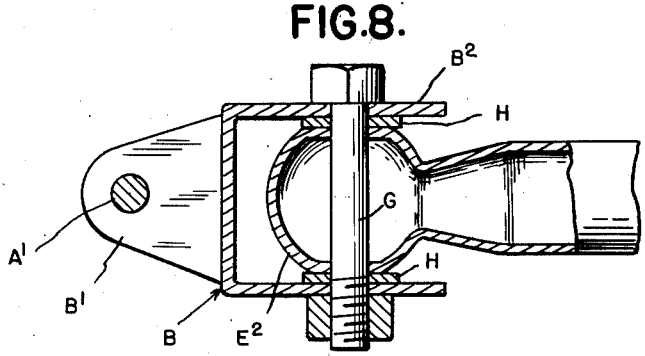
Fig. 8 is a similar view of another modification.

In the modified construction shown in Fig. 8 an integral spherical portion E² is used, this being sufficiently flexible and resilient to be deformed in the same manner as the construction shown in Fig. 7.

What I claim as my invention is:

A mirror support comprising a tubular arm formed of semi-cylindrical sections of resilient material having apertured generally semi-spherical portions at the inner ends thereof, the adjacent edges of said sections being relieved from the outer ends for a minor portion of the length thereof to fulcrum points adjacent to but spaced from said outer ends, the entire remainder of the adjacent edges of each section being in the diametral plane of each section, a tubular extension telescopically disposed within said arm and having a radius substantially less than the internal radius of said sections, a collar surrounding the outer end of said arm and having an internal radius less than the external radius of said sections thereby to draw the outer ends of said sections toward each other and to rock said sections about the fulcrum points provided at the junction of the relieved portions with the said adjacent edges of said sections and to spread said semi-spherical portions apart, a mounting bracket having spaced apertured ears receiving said semi-spherical portions therebetween when the inner ends of said sections are brought into abutting relation, thus requiring bending of said sections throughout the major portion of the length thereof to bring the semi-spherical portions between said ears, and a fastening element extending through the apertures in said ears and said semi-spherical portions.

THOMAS C. WHITEHEAD.

REFERENCES CITED

The following references are of record in the file of this patent:

UNITED STATES PATENTS

| Number | Name | Date |
| --- | --- | --- |
| 1,972,246 | Sauer | Sept. 4, 1934 |
| 2,113,251 | Dover | Apr. 5, 1938 |
| 2,134,016 | Zink | Oct. 25, 1938 |
| 2,392,110 | Alexander | Jan. 1, 1946 |
| 2,393,056 | Noblitt et al. | Jan. 15, 1946 |
| 2,526,306 | Van Gelder | Oct. 17, 1950 |

FOREIGN PATENTS

| Number | Country | Date |
| --- | --- | --- |
| 118,480 | Australia | May 18, 1944 |
| 465,699 | Great Britain | May 13, 1937 |